United States Patent [19]
Chapkovich

[11] Patent Number: 5,569,008
[45] Date of Patent: Oct. 29, 1996

[54] HYBRID PANEL FASTENER AND A RETENTION MECHANISM FOR USE IN COMBINATION THEREWITH FOR COMPOSITE ARTICLES

[75] Inventor: John S. Chapkovich, Derby, Conn.

[73] Assignee: United Technologies Corporation, Hartford, Conn.

[21] Appl. No.: 446,259

[22] Filed: May 22, 1995

[51] Int. Cl.$^6$ .............................. F16B 35/04; F16B 35/06
[52] U.S. Cl. ..................... 411/383; 411/424; 411/903
[58] Field of Search ................................ 411/383, 354, 411/402, 403, 404, 411, 424, 902, 903, 908, 401, 904, 338, 339, 901; 470/2, 3, 4, 206

[56] References Cited

U.S. PATENT DOCUMENTS

| | | | |
|---|---|---|---|
| 3,102,447 | 9/1963 | Gregory | 85/1 |
| 3,584,667 | 6/1971 | Reiland | 411/402 |
| 3,740,083 | 6/1973 | Zenhausern | 411/339 |
| 3,921,496 | 11/1975 | Helderman | 411/339 |
| 3,930,428 | 1/1976 | Hale | 411/910 |
| 4,126,338 | 11/1978 | Coel et al. | 411/383 |
| 4,432,680 | 2/1984 | Molina | 411/103 |
| 4,507,035 | 3/1985 | Monett | 411/377 |
| 4,609,315 | 9/1986 | Briles | 411/903 |
| 4,723,881 | 2/1988 | Duran | 411/112 |
| 4,784,554 | 11/1988 | Break | 411/383 |
| 4,789,283 | 12/1988 | Crawford | 411/902 |
| 4,854,438 | 8/1989 | Weissenberger | 192/107 |
| 4,863,330 | 9/1989 | Olez et al. | 411/424 |
| 4,975,014 | 12/1990 | Ruffin | 411/385 |
| 5,073,072 | 12/1991 | Parekh | 411/354 |
| 5,090,857 | 2/1992 | Dunn | 411/354 |
| 5,092,727 | 3/1992 | Moghe | 411/424 |
| 5,098,240 | 3/1992 | Gapp | 411/424 |
| 5,153,978 | 10/1992 | Simmons | 72/69 |
| 5,195,855 | 3/1993 | Atkinson et al. | 411/43 |
| 5,231,059 | 7/1993 | Leung et al. | 501/12 |
| 5,252,016 | 10/1993 | Schmid | 411/386 |
| 5,382,125 | 1/1995 | Dürr et al. | 411/403 |

FOREIGN PATENT DOCUMENTS

| | | | |
|---|---|---|---|
| 3546470 | 10/1986 | Germany | 411/401 |
| 0001476 | of 1875 | United Kingdom | 411/402 |

*Primary Examiner*—Lloyd A. Gall
*Attorney, Agent, or Firm*—Terrance J. Radke

[57] ABSTRACT

A hybrid panel fastener for use in conjunction with a nut and cage assembly for fastening and unfastening a composite access panel that is galvanically compatible with the composite access panel, suitable for low observability applications, and high cycle usage includes a composite shank member and a metallic sleeve member integrated in combination. The composite shank member includes an interface segment having a peripheral engagement surface, a body segment contiguous with the interface segment, and a head having a torque-input surface contiguous with the body segment. The metallic sleeve member has an externally threaded surface and an integration bore that is complementary to the peripheral engagement surface of the interface segment. The metallic sleeve member is mated with the composite shank member by press fit insertion of the metallic sleeve member onto the interface segment wherein the wall defining the integration bore mechanically engages the peripheral engagement surface of the interface segment to preclude relative rotation between the composite shank member and the metallic sleeve member. A retention mechanism for use in combination with the hybrid panel fastener is mounted in combination with the composite access panel and operative to retain the hybrid panel fastener in combination with the composite access panel by mechanically engaging the hybrid panel fastener upon threaded disengagement thereof from the nut and cage assembly.

8 Claims, 1 Drawing Sheet

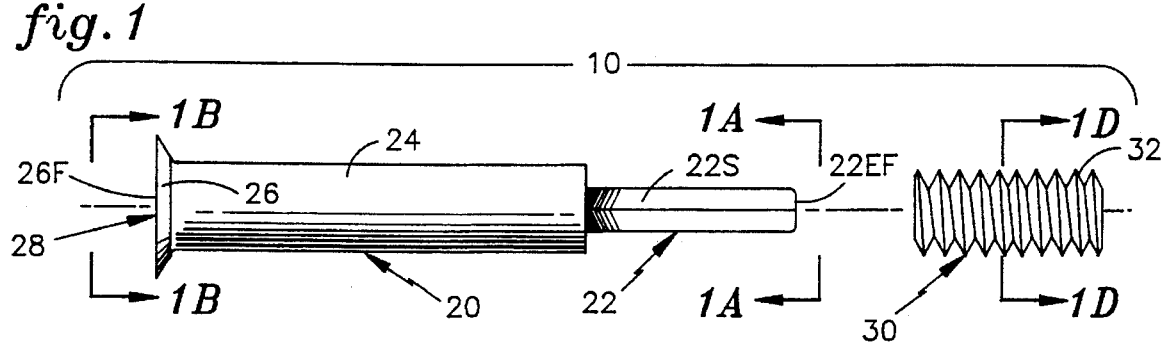
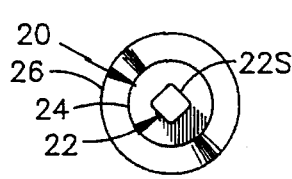
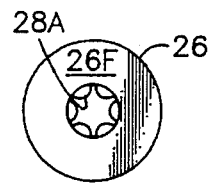
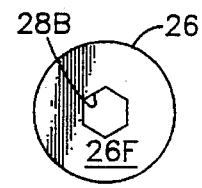
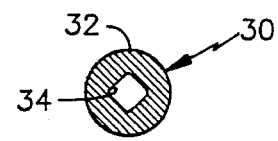
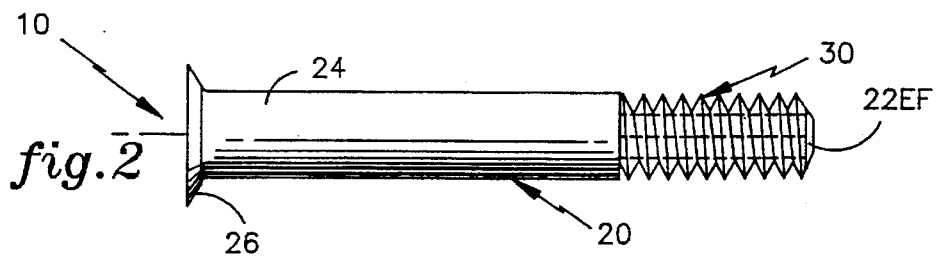
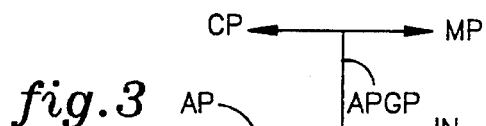
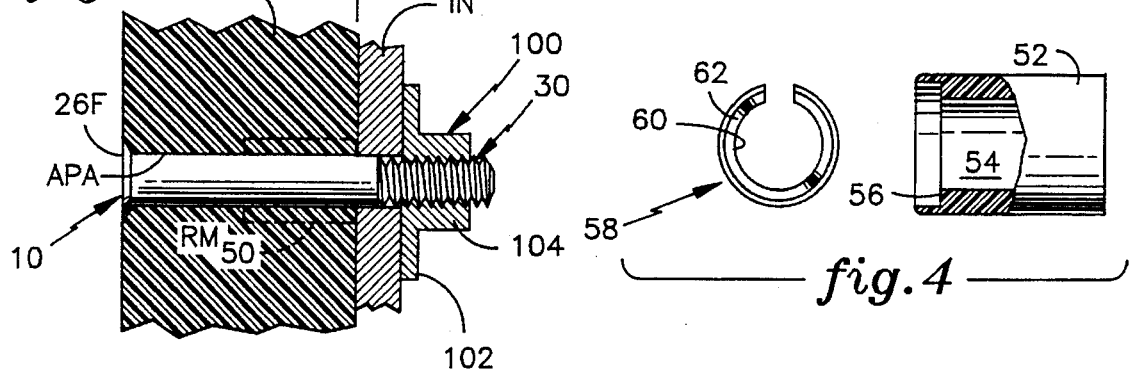
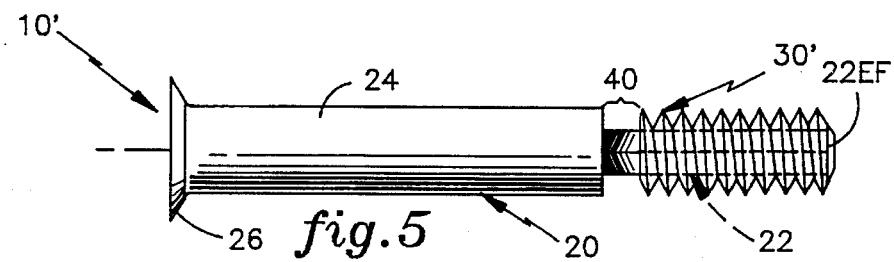

HYBRID PANEL FASTENER AND A RETENTION MECHANISM FOR USE IN COMBINATION THEREWITH FOR COMPOSITE ARTICLES

DESCRIPTION

1. Technical Field

The present invention is directed to fastening devices for composite articles, and more particularly, to a hybrid panel fastener that is a combination of composite and metallic components to provide galvanic compatibility with a composite access panel, suitability for low observability applications, and high cycle usage. The hybrid panel fastener may be used in combination with a retention mechanism to retain the hybrid panel fastener in combination with the composite access panel.

2. Background of the Invention

Present day helicopters, particularly military helicopters, are subject to a multiplicity of design constraints, and it is not unusual to encounter interactive relationships between two or more of such design constraints. Moreover, often times such interactive relationships between such design constraints impose antithetical requirements with respect to the helicopter design. Two such interactive design constraints for military helicopters, particularly helicopters configured for reconnaissance missions, are low radar observability (LO) and maintainability and supportability. To satisfy the LO design requirement, the helicopter is configured and/or fabricated from specialized composite materials to minimize the radar signature reflected to ground and/or air-based scanning/tracking radars. In addition to fabrication using specialized composite materials, the external surfaces of such helicopters are designed and fabricated to minimize abrupt contour changes or structural discontinuities to achieve LO design objectives in such helicopters. Abrupt contour changes/structural discontinuities change the electrical impedance of the helicopter fuselage which increases the cumulative aircraft signature due to reflected radar energy. Therefore, from the LO design perspective, abrupt external contours or external structural discontinuities should be avoided.

The maintainability and supportability design requirement, in contrast, requires that the various subsystems of the helicopter be readily accessible by the flight crew or ground support personnel for inspection, maintenance, and removal/ replacement. One method of achieving maintainability and supportability in helicopter design is through the use of modular subsystems that are readily accessible by means of external access panels and/or doors. Providing access to such modular subsystems through external access panels or doors significantly reduces the time required for routine inspections, maintenance, or component removal and replacement. It will be appreciated, however, that the accessibility provided by external access panels/doors requires the use of opening/closure mechanisms in combination with such external access panels/doors to facilitate repeated opening and closure of the external access panels/doors.

The use of external latch mechanisms for opening and closure of helicopter fuselage doors and/or access panels, however, create structural discontinuities which increase the reflected radar signature of the helicopter, and thus, are directly antithetical to LO design requirements. One prior art solution for minimizing the radar signature of such structural discontinuities includes absorptive coatings applied to the latch mechanism to absorb a portion of the incident radar energy. Another solution is to shape the latch mechanism to minimize the amount of radar energy reflected therefrom. While such solutions are generally effective, such solutions are disadvantageous inasmuch as they tend to increase the overall system weight and cost of the helicopter.

Still another solution is to provide internal latch mechanisms that eliminate external structural discontinuities. Internal latch mechanisms, however, are of limited utility inasmuch as internal access to such latch mechanisms must be available for engagement and disengagement thereof. While internal access is possible in some circumstances, the utility of internal latch mechanisms is limited for many applications, e.g., equipment bays, access doors/panels, etc. that must be externally accessible.

Another solution is to use external accessible fasteners to fasten and unfasten composite access panels with respect to the helicopter fuselage. Such fasteners, to comply with the LO design requirement, should be configured so that in the engaged position, i.e., the access panel in the fastened position, the fasteners do not present structural discontinuities in the external surfaces of the fuselage, i.e., the fasteners are "flush" with the external fuselage surface. It will be appreciated, however, that metallic fasteners are generally incompatible with the LO design constraint inasmuch as metallic fasteners function as reflective surfaces with respect to incident electromagnetic radiation.

Composite fasteners may be utilized for compatibility with LO design constraints. U.S. Pat. Nos. 5,252,016, 5,098, 240, 5,073,072, 4,975,014, 4,854,438, 4,507,035, and 3,102, 447 illustrate representative examples of composite fasteners. An examination of these patents, however, shows that such prior art composite fasteners tend to be relatively complex devices, which increases the overall cost of fabrication, assemblage, and usage of such composite fasteners. In addition, the maintainability and supportability design requirement generally dictates that external fasteners for composite access panels be capable of high cycle usage, i.e., a multiplicity of engagements and disengagements. One drawback to the use of composite fasteners is that the threaded portion of the composite fastener is generally susceptible to mechanical degradation under high cycle usage such that composite panel fasteners must be replaced more frequently than metallic panel fasteners, which increases the overall costs associated with maintainability and supportability.

A need exists to provide a panel fastener for use in combination with composite access panels that is acceptable with respect to both the LO design constraint and the maintainability and supportability design constraint. Such a panel fastener should be relatively light weight, low cost, and relatively easy to fabricate and use.

DISCLOSURE OF THE INVENTION

One object of the present invention is to provide a hybrid panel fastener for use in conjunction with a composite access panel for fastening and unfastening thereof wherein the hybrid panel fastener is configured and fabricated for galvanic compatibility with the composite access panel, suitability for low observability applications, and high cycle usage.

Another object of the present invention is to provide a hybrid panel fastener that is a lighter, lower cost, and less mechanically complex replacement for latch mechanisms employed as opening/closure mechanisms for aircraft access panels.

These and other objects of the present invention are achieved by a hybrid panel fastener for use in conjunction with a nut and cage assembly for fastening and unfastening a composite access panel that comprises a shank member fabricated as a unitary component from a composite material having a low dielectric constant. The composite shank member includes an interface segment having a peripheral engagement surface, a body segment having a cylindrical configuration contiguous with the interface segment, and a head contiguous with the body segment. The head includes a torque-input surface for applying torque to the head to engage and disengage the hybrid panel fastener with the nut and cage assembly to fasten and unfasten the composite access panel, respectively.

The hybrid panel fastener further comprises a metallic sleeve member having an externally threaded surface and an integration bore that is complementary to the peripheral engagement surface of the composite shank member for mating the metallic sleeve member in combination with the composite shank member to preclude relative rotation therebetween. The mated sleeve member is secured to the composite shank member to form the hybrid panel fastener. The hybrid panel fastener is disposed in combination with the composite access panel wherein the externally threaded surface of the metallic sleeve member is engageable and disengageable with the nut and cage assembly to fasten and unfasten the composite access panel, respectively.

An ancillary object of the present invention is to provide, in combination, a hybrid panel fastener and a retention mechanism for use in conjunction with a nut and cage assembly for fastening and unfastening a composite access panel wherein the hybrid panel fastener is retained in combination with the composite access panel upon disengagement from the nut and cage assembly. This ancillary objective is achieved by means of the hybrid panel fastener described in the preceding paragraphs wherein the metallic sleeve member is dimensioned so that the mated metallic sleeve member and the body segment in combination define a gap therebetween.

A retention mechanism includes a body member having a fastener aperture and a shoulder contiguous with the fastener aperture and a resilient retention collar that has a substantially annular tapered configuration that defines an internal channel. The retention mechanism is mounted in combination with the composite access panel so that the hybrid panel fastener extends through the fastener aperture and the internal channel wherein the resilient retention collar mechanically engages the gap of the hybrid panel fastener during disengagement thereof from the nut and cage assembly to retain the hybrid panel fastener in combination with the composite access panel with the metallic sleeve member disengaged from the nut and cage assembly.

BRIEF DESCRIPTION OF THE DRAWINGS

A more complete understanding of the present invention and the attendant features and advantages thereof may be had by reference to the following detailed description of the invention when considered in conjunction with the accompanying drawings wherein:

FIG. 1 is an exploded plan view of one embodiment of a hybrid panel fastener according to the present invention.

FIG. 1A is an end plan view of the composite shank member of the hybrid panel fastener of FIG. 1 taken along line 1A—1A thereof.

FIGS. 1B, 1C are end plan views of illustrative embodiments of the head of the composite shank member of the hybrid panel fastener of FIG. 1 taken along line 1B—1B thereof.

FIG. 1D is a cross-sectional view of the metallic sleeve member of the hybrid panel fastener of FIG. 1 taken along line 1D—1D thereof.

FIG. 2 is the hybrid panel fastener of FIG. 1 in the assembled state.

FIG. 3 is a partial cross-sectional view illustrating an exemplary application for the assembled hybrid panel fastener of FIG. 2.

FIG. 4 is an exploded, partial cross-sectional view of a retention mechanism for use in combination with the embodiment of the hybrid panel fastener illustrated in FIG. 5.

FIG. 5 is another embodiment of a hybrid panel fastener according to the present invention.

BEST MODES FOR CARRYING OUT THE INVENTION

Referring now to the drawings wherein like reference numerals identify corresponding or similar elements throughout the several views, FIGS. 1, 1A–1D, and 2 depict one embodiment of a hybrid panel fastener 10 according to the present invention. The hybrid panel fastener 10 is operative to provide an engagement and disengagement capability for composite access panels, e.g., external access panels for helicopter equipment bays (as used herein, the "panel" terminology encompasses doors or other types of movable structural members that are operative to close an access aperture), wherein the composite access panels may be repeatedly fastened and unfastened, respectively. The hybrid panel fastener 10 is configured and fabricated for: (i) galvanic compatibility with composite access panels, (ii) suitability for low observable (LO) applications, and (iii) high cycle usage. The hybrid panel fastener 10 is a lighter, lower cost, and less mechanically complex replacement for latch mechanisms that may be employed as the opening/closure mechanism for aircraft access panels in selected applications.

The hybrid panel fastener 10 of the present invention comprises a composite shank member 20 and a metallic sleeve member 30 that are integrated in combination by mating the metallic sleeve member 30 with the composite shank member 20 and securing the mated metallic sleeve member 30 to the composite shank member 20. The composite shank member 20 is fabricated as a unitary component utilizing a conventional fabrication technique, e.g., injection molding, from a composite material that is galvanically compatible with the composite access panel and that is suitable for LO applications. The composite material is a fibrous material such as fiberglass, graphite, or quartz embedded in a resinous matrix material. The salient characteristic of the resinous matrix material for fabricating the composite shank member 20 is a low dielectric constant which provides the suitability for LO applications as discussed in further detail hereinbelow. For example, one such resinous matrix material having utility in fabricating the composite shank member 20 of the hybrid panel fastener 10 is polyetheretherketone (PEEK), a semi-crystalline thermoplastic that has a melting temperature of approximately 650° F. Other suitable resinous matrix materials having a low dielectric constant similar to that of PEEK are known to those skilled in the art. Preferably, the fibers of the fibrous material comprising the composite shank member 20 are orientated parallel to the axis of the composite shank member 20.

Structurally, the composite shank member 20 comprises an interface segment 22, a body segment 24, and a head 26. The interface segment 22 has a peripheral engagement surface 22S that accommodates mating of the composite shank member 20 with the metallic sleeve member 30 without relative movement, i.e., slippage, therebetween when torque is applied to the hybrid panel fastener 10. As illustrated in FIG. 1A, the interface segment 22 has a square peripheral engagement surface 22S. One skilled in the art will appreciate that other peripheral engagement surfaces 22S, e.g., hexagonal, star-shaped (see, e.g., FIG. 1B) may be utilized so long as the peripheral engagement surface 22S functions to preclude slippage between the composite shank member 20 and the metallic sleeve member 30. Ease of fabrication of the interface segment 22 of the composite shank member 20 is a primary determinant in defining the peripheral engagement surface 22S for the interface segment 22.

The body segment 24 has a cylindrical configuration that is complementary to the corresponding aperture in the access panel (see discussion hereinbelow with respect to FIG. 3), and is sized so that the body segment 24 is freely rotatable in the complementary access panel aperture. The head 26 of the described embodiment of the composite shank member 20 has a tapered configuration. The hybrid panel fastener 10 is sized so that the face 26F of the head 26 is flush with the exterior surface of the access panel (see, e.g., FIG. 3) with the hybrid panel fastener 10 in the engaged state. The face 26F of the head 26 includes a torque-input surface 28 as illustrated generally in FIG. 1 and in further detail in FIGS. 1B, 1C.

The torque-input surface 28 is operative to facilitate application of torque to the hybrid panel fastener 10 to engage and disengage the access panel from the adjacent infrastructure, e.g., the helicopter airframe (see, e.g., FIG. 3). The configuration of the torque-input surface 28 is designed of have a high stress capability, i.e., even distribution of the applied torque over multiple engagement surfaces, such that minimal structural distortion of the torque-input surface 28 is experienced over the usage cycle of the hybrid panel fastener 10. A preferred configuration for the torque-input surface 28 is a star shape as exemplarily illustrated in FIG. 1B (reference numeral 28A) as experience has demonstrated that a star shape is subject to less structural distortion due to high cycles of applied torque. While a star shape having six points is illustrated in FIG. 1B, one skilled in the art will appreciate that other star configurations may be used, i.e., more or less than six points. Another configuration for the torque-input surface 28 is a polygon as exemplarily illustrated in FIG. 1C (reference numeral 28B). While a hexagon is illustrated in FIG. 1C, one skilled in the art will appreciate that other polygonal configurations may be used.

The metallic sleeve member 30 is exemplarily illustrated in FIGS. 1, 1D, and comprises an externally threaded surface 32 and an integration bore 34. The metallic sleeve member 30 is fabricated utilizing a conventional fabrication technique, e.g., extrusion and subsequent threading, from a metallic material, e.g., typically a metal such as aluminum, that provides a high degree of durability to satisfy the high usage cycle design requirement of the hybrid panel fastener 10, i.e., minimization of mechanical distortion of the externally threaded surface 32, while concomitantly being lightweight. With respect to the embodiment described herein, the high usage cycle was defined as a minimum of two hundred engagements and disengagements of the hybrid panel fastener 10 from a conventional nut and cage assembly as described hereinbelow in further detail.

The externally threaded surface 32 of the metallic sleeve member 30 has a cylindrical configuration that is compatible with the insertion of the hybrid panel fastener 10 into the access panel aperture so that the metallic sleeve member 30 passes through the access panel aperture to threadingly engage a nut and cage assembly. The wall that defines the integration bore 34 has a configuration that is complementary to the peripheral engagement surface 22S of the interface segment 22. The integration bore 34 is sized so that the metallic sleeve member 30 may be mated with the interface segment 22 by press fit insertion of the metallic sleeve member 30 onto the interface segment 22 wherein the wall of the integration bore 34 mechanically engages the complementary peripheral engagement surface 22S to preclude relative rotation between the mated combination of the composite shank member 20 and the metallic sleeve member 30.

To integrate the metallic sleeve member 30 in combination with the composite shank member 20 to form the hybrid panel fastener 10 according to the present invention, the metallic sleeve member 30 is mated with the interface segment 22 and secured in combination therewith by any conventional technique, e.g., bonding, mechanical securement, to ensure that the metallic sleeve member 30 does not inadvertently disengage from the composite shank member 20 during use. As illustrated in FIG. 2, the end face 22EF (see also FIG. 1) of the interface segment 22 is mechanically upset to effectively form a flange that mechanically engages the end of the metallic sleeve member 30 to secure the metallic sleeve member 30 in integrated combination with the composite shank member 20.

The embodiment of the hybrid panel fastener 10 described in the preceding paragraphs is configured for use in conjunction with a conventional nut and cage assembly to engage and disengage a composite access panel such that the composite access panel may be repeatedly fastened and unfastened, respectively. FIG. 3 depicts a composite access panel AP, which includes one or more access panel apertures APA, that is hinged in combination with an infrastructure IN by conventional hinging means (not shown). At least one conventional nut and cage assembly 100, which includes a base segment 102 and an internally threaded nut segment 104, is conventionally secured in combination with the infrastructure IN by means of the base segment 102. The internally threaded nut segment 104 is configured for threaded engagement with the externally threaded surface 32 of the metallic sleeve member 30 of the hybrid panel fastener 10 according to the present invention. The hybrid panel fastener 10 is inserted into the access panel aperture APA and torque is applied to the torque-input surface 28 to cause the metallic sleeve member 30 to threadingly engage the internally threaded nut segment 104 to fasten the composite access panel AP in closed combination with the infrastructure IN (as illustrated in FIG. 3). Conversely, the hybrid panel fastener 10 may be threadingly disengaged from the internally threaded nut segment 104 such that the composite access panel AP may be unfastened to permit opening of the composite access panel AP for access to the interior of the infrastructure IN.

With the hybrid panel fastener 10 threadingly engaged in conjunction with the nut and cage assembly 100, the face 26F of the head 26 is flush with the exterior surface of the composite access panel AP. Physically, therefore, the hybrid panel fastener 10 does not present any structural discontinuity on the external surface of the composite access panel AP which would act as a reflective surface with respect to electromagnetic energy, e.g., radar, incident upon the external surface of the composite access panel AP. In addition, since the composite shank member 20 of the hybrid panel fastener 10 is fabricated as a low dielectric constant component for LO applications, electromagnetic radiation is readily coupled through the composite shank member 20 to the access panel metallic ground plane APGP (see FIG. 3 wherein the reference characters CP identify the composite portion of the hybrid panel fastener 10 with respect to the metallic ground plane APGP, i.e., the composite shank member 20, and the reference characters MP identify the metallic portion of the hybrid panel fastener 10 with respect to the metallic ground plane APGP, i.e., the metallic sleeve member 30), for LO applications. With the hybrid panel fastener 10 engaged in conjunction with the nut and cage assembly 100, the metallic sleeve member 30 is shielded by the metallic ground plane APGP from electromagnetic radiation being coupled through the composite access panel AP and the composite shank member 20 of the hybrid panel fastener 10, i.e., functionally, the metallic sleeve member 30 does not act as a reflective surface with respect to electromagnetic radiation coupled through the composite access panel AP and the composite shank member 20 of the hybrid panel fastener 10.

While the hybrid panel fastener 10 described hereinabove is suitable for use in most applications in conjunction with only a conventional nut and cage assembly, it was determined that the hybrid panel fastener of the present invention would be even more efficacious if a retention mechanism is incorporated in interactive combination with the hybrid panel fastener. As the hybrid panel fastener is disengaged from the nut and cage assembly 100 to unfasten the composite access panel AP, the retention mechanism is operative to automatically retain the hybrid panel fastener in combination with the composite access panel AP once the hybrid panel fastener is fully disengaged from the nut and cage assembly 100. The retention mechanism ensures that the hybrid panel fastener is not inadvertently misplaced when the composite access panel AP is opened, i.e., the hybrid panel fastener 10 is mechanically retained in the access panel aperture APA by means of the retention mechanism.

One embodiment of a retention mechanism 50 for use in combination with a hybrid panel fastener according to the present invention is illustrated in FIG.4. The retention mechanism 50 is designed to be mounted in combination with the composite access panel AP as exemplarily illustrated in FIG. 3 (dashed lines identified by reference characters $RM_{50}$ illustrate the positioning of the retention mechanism 50 in the composite access panel AP). Inasmuch as the integrated retention mechanism 50 in the access panel AP is situated with respect to the access panel metallic ground plane APGP so as to be a factor in the electromagnetic radiation coupling mechanism, the retention mechanism 50 is fabricated from a composite material that is suitable for LO applications, e.g., PEEK.

The retention mechanism 50 includes a body member 52 (the described embodiment has a cylindrical configuration) and a resilient retention collar 58. The body member 52 has a fastener aperture 54 extending therethrough that is dimensioned to accommodate passage therethrough of the metallic sleeve member 30 and the composite shank member 20 of the hybrid panel fastener 10' described in further detail hereinbelow. The body member 52 further includes a shoulder 56 contiguous with the end of the fastener aperture 54 that is distal the access panel ground plane APGP. The resilient retention collar 58 has a substantially annular tapered configuration (reference numeral 62 in FIG. 4 identifies the tapered portion of the resilient retention collar 58) that defines an internal channel 60. The internal channel 60 is dimensioned to accommodate induced biasing in the resilient retention collar 58, i.e., expansion thereof, due to passage of the metallic sleeve member 30 and the composite shank member 20 of the hybrid panel fastener 10' therethrough. The resilient retention collar 58, in the unbiased state, is dimensioned to nest in the shoulder 56 of the body member 52. The shoulder 56 is sized to accommodate the expansion of the resilient retention collar 58 due to biasing force induced therein due to mechanical interaction with the hybrid panel fastener 10'.

The embodiment of the hybrid panel fastener 10' illustrated in FIG. 5 is similar to the hybrid panel fastener 10 described hereinabove except for the structural interrelationship between the exterior surfaces of the composite shank member and the metallic sleeve member. As an examination of FIG. 2 shows, the metallic sleeve member 30 of the hybrid panel fastener 10 is dimensioned so that the exterior surface thereof is continuous with the exterior surface of the body segment 24 of the composite shank member 20. For the embodiment of the hybrid panel fastener 10' illustrated in FIG. 5, in contrast, the metallic sleeve member 30' is dimensioned so that there is a discontinuity or gap 40 defined between the exterior surfaces of the body segment 24 and the metallic sleeve member 30'. The metallic sleeve member 30' is sized so that the dimension of the defined gap 40 will accommodate the resilient collar member 58 of the retention mechanism 50.

As the hybrid panel fastener 10' is initially inserted into the access panel aperture APA to threadingly engage the internally threaded nut segment 104 of the nut and cage assembly 100, the hybrid panel fastener 10' mechanically interacts with resilient collar member 58, with the tapered portion 62 of the resilient collar member 58 facilitating such mechanical interaction, to bias the resilient collar member 58 outwardly. The shoulder 56 of the body member 52 accommodates the resilient collar member 58 in the biased or expanded state. With the hybrid panel fastener 10' engaged in threaded combination with the nut and cage assembly 100, the resilient collar member 58 is maintained in the biased state by the mechanical interaction between the body segment 24 of the hybrid panel fastener 10' and the resilient collar member 58.

When the hybrid panel fastener 10' is subsequently disengaged from the nut and cage assembly 100, the mechanical interaction between the body segment 24 of the hybrid panel fastener 10' and the resilient collar member 58 maintains the resilient collar member 58 in the biased state. When the metallic sleeve member 30' is fully disengaged from the internally threaded nut segment 104 of the nut and cage assembly 100, the gap 40 of the hybrid panel fastener 10' is aligned with the resilient retention collar 58. This alignment allows the resilient retention collar 58 to contract to its original dimensions by moving inwardly into the gap 40. The mechanical engagement of the resilient retention collar 58 in the gap 40 causes the hybrid panel fastener 10' to be retained in the access panel aperture APA of the composite access panel AP.

A variety of modifications and variations of the present invention as described hereinabove are possible in light of the above teachings. It is therefore to be understood that, within the scope of the appended claims, the present invention may be practiced otherwise than as specifically described herein.

What is claimed is:

1. A hybrid panel fastener for use in conjunction with a nut and cage assembly secured to an infrastructure for fastening and unfastening a composite access panel in combination with the infrastructure, comprising:

a shank member fabricated as a unitary component from a composite material having a low dielectric constant, said composite shank member including an interface segment having a peripheral engagement surface, a body segment having a cylindrical configuration contiguous with said interface segment, and a head contiguous with said body segment, said head including a torque-input surface for applying torque to said head to engage and disengage said hybrid panel fastener with the nut and cage assembly to fasten and unfasten the composite access panel in combination with the infrastructure, respectively; and a unitary metallic sleeve member having an externally threaded surface and an integration bore that is complementary to said peripheral engagement surface of said interface segment, said unitary metallic sleeve member being mated in combination with said composite shank member by press fit insertion of said unitary metallic sleeve member onto said interface segment of said composite shank member wherein said integration bore mechanically engages said peripheral engagement surface to preclude relative rotation between said unitary metallic sleeve member and said composite shank member;

said mated unitary metallic sleeve member being secured to said composite shank member to form said hybrid panel fastener;

said hybrid panel fastener being disposed in combination with the composite access panel wherein said externally threaded surface of said unitary metallic sleeve member is engageable and disengageable with the nut and cage assembly to fasten and unfasten the composite access panel in combination with the infrastructure, respectively.

2. The hybrid panel fastener of claim 1 wherein said torque-input surface is a star-shaped surface.

3. The hybrid panel fastener of claim 1 wherein said torque-input surface is a polygonal-shaped surface.

4. The hybrid panel fastener of claim 1 wherein said peripheral engagement surface of said interface segment is a star-shaped configuration.

5. The hybrid panel fastener of claim 1 wherein said peripheral engagement surface of said interface segment is a polygonal-shaped configuration.

6. The hybrid panel fastener of claim 5 wherein said polygonal-shaped configuration is a square.

7. The hybrid panel fastener of claim 1 wherein said composite material forming said composite shank member comprises a fibrous material embedded in a polyetheretherketone matrix and wherein said unitary metallic sleeve member is fabricated from aluminum.

8. In combination, a hybrid panel fastener and a retention mechanism for use in conjunction with a nut and cage assembly secured to an infrastructure for fastening and unfastening a composite access panel in combination with the infrastructure, comprising:

a shank member fabricated as a unitary component from a composite material having a low dielectric constant, said composite shank member including an interface segment having a peripheral engagement surface, a body segment having a cylindrical configuration contiguous with said interface segment, and a head contiguous with said body segment, said head including a torque-input surface for applying torque to said head to engage and disengage said hybrid panel fastener with the nut and cage assembly to fasten and unfasten the composite access panel in combination with the infrastructure, respectively;

a unitary metallic sleeve member having an integration bore that is complementary to said peripheral engagement surface of said interface segment and an externally threaded surface;

said unitary metallic sleeve member being mated in combination with said composite shank member by press fit insertion of said unitary metallic sleeve member onto said interface segment of said composite shank member wherein said integration bore mechanically engages said peripheral engagement surface to preclude relative rotation between said unitary metallic sleeve member and said composite shank member, said unitary metallic sleeve member being dimensioned so that said mated unitary metallic sleeve member and said body segment in combination define a gap therebetween;

said mated unitary metallic sleeve member being secured to said interface segment to form said hybrid panel fastener; and wherein said retention mechanism, which is fabricated from a composite material having a low dielectric constant, includes a body member having a fastener aperture and a shoulder contiguous with said fastener aperture, and a resilient retention collar having a substantially annular tapered configuration that defines an internal channel;

said retention mechanism being mounted in combination with the composite access panel so that said hybrid panel fastener extends through said fastener aperture and said internal channel wherein said resilient retention collar mechanically engages said gap of said hybrid panel fastener during disengagement thereof from the nut and cage assembly to retain said hybrid panel fastener in combination with the composite access panel with said unitary metallic sleeve member disengaged from the nut and cage assembly.

* * * * *